United States Patent
Amberny et al.

(10) Patent No.: US 9,191,479 B2
(45) Date of Patent: Nov. 17, 2015

(54) TELEPHONE HANDSET, BASE AND ASSOCIATED METHOD FOR UPDATING THE SOFTWARE OF THE HANDSET

(75) Inventors: Olivier Amberny, Palaiseau (FR); Hervé Artus, Paris (FR); Matthieu Dumont, Paris (FR)

(73) Assignee: INVENTEL, Paris (FR)

( * ) Notice: Subject to any disclaimer, the term of this patent is extended or adjusted under 35 U.S.C. 154(b) by 1338 days.

(21) Appl. No.: 11/633,317

(22) Filed: Dec. 4, 2006

(65) Prior Publication Data
US 2007/0169105 A1   Jul. 19, 2007

(30) Foreign Application Priority Data
Dec. 5, 2005 (FR) ....................... 05 53731

(51) Int. Cl.
*G06F 9/44* (2006.01)
*H04M 1/725* (2006.01)
*G06F 9/445* (2006.01)
*H04M 1/727* (2006.01)

(52) U.S. Cl.
CPC ............ *H04M 1/72525* (2013.01); *G06F 8/65* (2013.01); *H04M 1/727* (2013.01); *H04M 1/72502* (2013.01); *H04M 2250/08* (2013.01)

(58) Field of Classification Search
CPC ............... G06F 8/65; G06F 8/61; G06F 8/71
USPC ........... 717/168–178; 455/418, 419, 572–574
See application file for complete search history.

(56) References Cited

U.S. PATENT DOCUMENTS

| | | | |
|---|---|---|---|
| 5,689,825 A * | 11/1997 | Averbuch et al. | 455/418 |
| 5,822,181 A | 10/1998 | Jung | |
| 6,070,012 A * | 5/2000 | Eitner et al. | 717/168 |
| 6,154,010 A | 11/2000 | Geiger | |
| 6,275,882 B1 | 8/2001 | Cheever et al. | |
| 6,308,061 B1 * | 10/2001 | Criss et al. | 455/418 |
| 6,363,256 B1 | 3/2002 | Muller et al. | |
| 6,397,385 B1 * | 5/2002 | Kravitz | 717/173 |
| 6,461,181 B1 | 10/2002 | Goh et al. | |
| 6,761,578 B1 | 7/2004 | Stavely et al. | |
| 6,876,644 B1 | 4/2005 | Hsu et al. | |
| 7,055,148 B2 * | 5/2006 | Marsh et al. | 717/172 |
| 7,254,386 B2 * | 8/2007 | Rajaram | 455/418 |

(Continued)

FOREIGN PATENT DOCUMENTS

| | | |
|---|---|---|
| DE | 19912041 | 9/2001 |
| DE | 10054943 | 5/2002 |

(Continued)

OTHER PUBLICATIONS

Search Report Dated Sep. 7, 2006.

*Primary Examiner* — Satish Rampuria
(74) *Attorney, Agent, or Firm* — Tutunjian & Bitetto, P.C.

(57) ABSTRACT

The present invention relates to a telephone handset, a base and an associated method for updating the software of the handset.
The communication base comprises a radio interface to communicate with a communication device operating by means of a software application, a charger circuit and a means of detecting a new version of the software.
The communication base comprises a means for notifying the device, via the radio means, of the availability of the new software version and a means for transmitting the new software version to the device when the charger circuit is connected to the battery charging circuit of the device.

34 Claims, 6 Drawing Sheets

(56) References Cited

U.S. PATENT DOCUMENTS

| | | | |
|---|---|---|---|
| 2001/0047514 A1* | 11/2001 | Goto et al. | 717/11 |
| 2002/0102997 A1 | 8/2002 | Pan | |
| 2003/0023964 A1 | 1/2003 | Rajaram et al. | |
| 2003/0069007 A1 | 4/2003 | Rajaram et al. | |
| 2003/0172175 A1 | 9/2003 | McCormack et al. | |
| 2004/0015939 A1* | 1/2004 | Cheah et al. | 717/168 |
| 2004/0068721 A1 | 4/2004 | O'Neill et al. | |
| 2004/0131086 A1 | 7/2004 | Bednarek et al. | |
| 2004/0131133 A1 | 7/2004 | Bednarek et al. | |
| 2004/0153543 A1 | 8/2004 | Thomas | |
| 2004/0261072 A1 | 12/2004 | Herle | |
| 2005/0022178 A1* | 1/2005 | Ghafoor et al. | 717/171 |
| 2005/0136968 A1* | 6/2005 | Nakayama et al. | 455/550.1 |
| 2005/0170827 A1 | 8/2005 | Nagashima | |
| 2005/0186953 A1* | 8/2005 | Harris | 455/419 |
| 2005/0246703 A1* | 11/2005 | Ahonen | 717/172 |
| 2006/0101447 A1* | 5/2006 | Koch | 717/168 |

FOREIGN PATENT DOCUMENTS

| | | |
|---|---|---|
| EP | 924581 | 6/1999 |
| EP | 1429569 | 6/2004 |
| EP | 1573866 | 7/2004 |
| EP | 1536654 | 6/2005 |
| EP | 1649813 | 4/2006 |
| GB | 2254225 | 9/1992 |
| GB | 2310344 | 8/1997 |
| GB | 2397729 | 7/2004 |
| JP | 2002111573 | 4/2002 |
| JP | 2003009250 | 10/2003 |
| JP | 2004110610 | 4/2004 |
| JP | 2005222171 | 8/2005 |
| SE | 9901798 | 11/2000 |
| WO | WO0101631 | 1/2001 |
| WO | WO0122606 | 3/2001 |
| WO | WO2004057711 | 7/2004 |
| WO | WO2005009247 | 2/2005 |

* cited by examiner

TELEPHONE HANDSET, BASE AND ASSOCIATED METHOD FOR UPDATING THE SOFTWARE OF THE HANDSET

This application claims the benefit, under 35 U.S.C. §119 French Patent Application 0553731, filed Dec. 5, 2005.

BACKGROUND OF THE INVENTION

The present invention relates to a telephone handset, a base and an associated method for updating the software of the handset.

The present invention relates to a telephone handset operating with a software application and a base enabling the update of the software when the handset is charging on the base. If this base is connected to a network, the software of the telephone handset can receive the update of the software via the network.

SUMMARY OF THE INVENTION

The invitation also concerns a method for carrying out the said loading of the new software of the handset by the base.

For this purpose, the object of the invention is a communication base comprising a radio interface to communicate with a communication device operating by means of a software application, a charger circuit and a means of detecting a new version of the software.

According to the invention, the base comprises means for notifying the device, via the radio means, of the availability of the new software version and means for transmitting the new software version to the device when the charger circuit is connected to the battery charging circuit of the device.

In a surprising manner, the base does not automatically transmit the new version of the software by the radio link. But the base notifies the handset that a new software version is available. The handset remains operational with the current software version; the new software version is only downloaded when the handset is connected to the base via the battery charging circuit.

According to one embodiment, the means for transmitting the new software version to the device uses the charger circuit.

The mechanisms implemented use charging contacts between the base and the handset, there is therefore no additional connector. It is not necessary to request the user to carry out any particular manipulation. The update can be achieved in a totally transparent manner for the user. The mechanisms implemented do not require any extra memory to be added to the handset. The advantage of operating by the charging circuit is that it does not require extra memory to store the new application temporarily. Moreover, the space occupied by the downloading program is also greatly reduced; there is no need to support a radio protocol specifically for loading the new version of the software.

In one embodiment, the communication base comprises a means of checking the compatibility of the device with the new software.

Indeed all the handsets connected to the base are not supposed to be compatible with the same software versions, and the new version may relate only to some handsets.

According to one embodiment, the communication by means of the charging circuit is carried out by means of the Universal Asynchronous Receiver Transmitter communication protocol.

According to one embodiment, the communication base is a base for a domestic cordless telephone.

According to one embodiment, the radio link complies with the Digital Enhanced Cordless Communications standard.

According to one embodiment, the communication base comprises an interface to a communication network for detecting and downloading the new version of the software.

The object of the invention is also a communication device operating by means of a software application, comprising a radio interface for communicating with a base, a charger circuit, a user interface.

According to the invention, when it is notified of a new software version by the base, the device comprises means for indicating the availability of the new version of the software on the user interface.

The software is not downloaded automatically via the wireless link. But the handset is notified of the availability of the new version. The user can also know whether the new version is available via the user interface of the handset. The user does not need to check whether a new version is available; the verification occurs automatically by the base.

According to one embodiment, the device comprises means for receiving the new version of the software when the charging circuit is connected to the charger circuit of the base.

According to one embodiment, the means for receiving the new software version uses the charger circuit.

According to one embodiment, the device is a telephone handset.

The object of the invention is also a method in a telephone handset operating with a software application, for downloading a new version of the software, the said handset comprising a radio interface for communicating with a base, a charging circuit and a user interface. The method comprises the step of receiving information on the availability of the new software version from the base.

According to the invention, the method comprises an indication step on the user interface of the handset of the availability of the new software.

According to one embodiment, the method comprises a step for downloading the new version of the software when the charging circuit of the handset is connected to the charger circuit of the base.

The object of the invention is also a method in a base communicating with a telephone handset operating with a software application, for downloading a new version of the software. The base comprises a radio interface for communicating with the handset, a charger circuit, an interface to a communication network and means of detecting a new version of the software. The method comprises the steps for detecting a new software version, checking that the new software version is supported by the handset and informing the handset on the availability of the new software version by the base.

According to the invention, when the charging circuit of the handset is connected to the charger circuit of the base, the method comprises steps for verifying that the software of the handset must be updated and downloading the new version of the base onto the handset.

According to one embodiment, the method comprises a step for downloading the new version of the software when the charging circuit of the handset is connected to the charger circuit of the base.

According to one embodiment, the downloading step occurs between a server located on the network and the handset.

BRIEF DESCRIPTION OF THE DRAWINGS

The invention will be better understood and illustrated by means of the following embodiments and implementations, by no means limiting, with reference to the figures attached in the appendix, in which:

In FIG. 1, the modules shown are functional units that may or may not correspond to physically distinguishable units. For example, these modules or some of them can be grouped together in a single component, or constitute functions of the same software. Contrariwise, some modules can possibly be composed of separate physical entities. The same references designate identical or similar elements in the different figures.

DETAILED DESCRIPTION OF PREFERRED EMBODIMENTS

Figure 1:
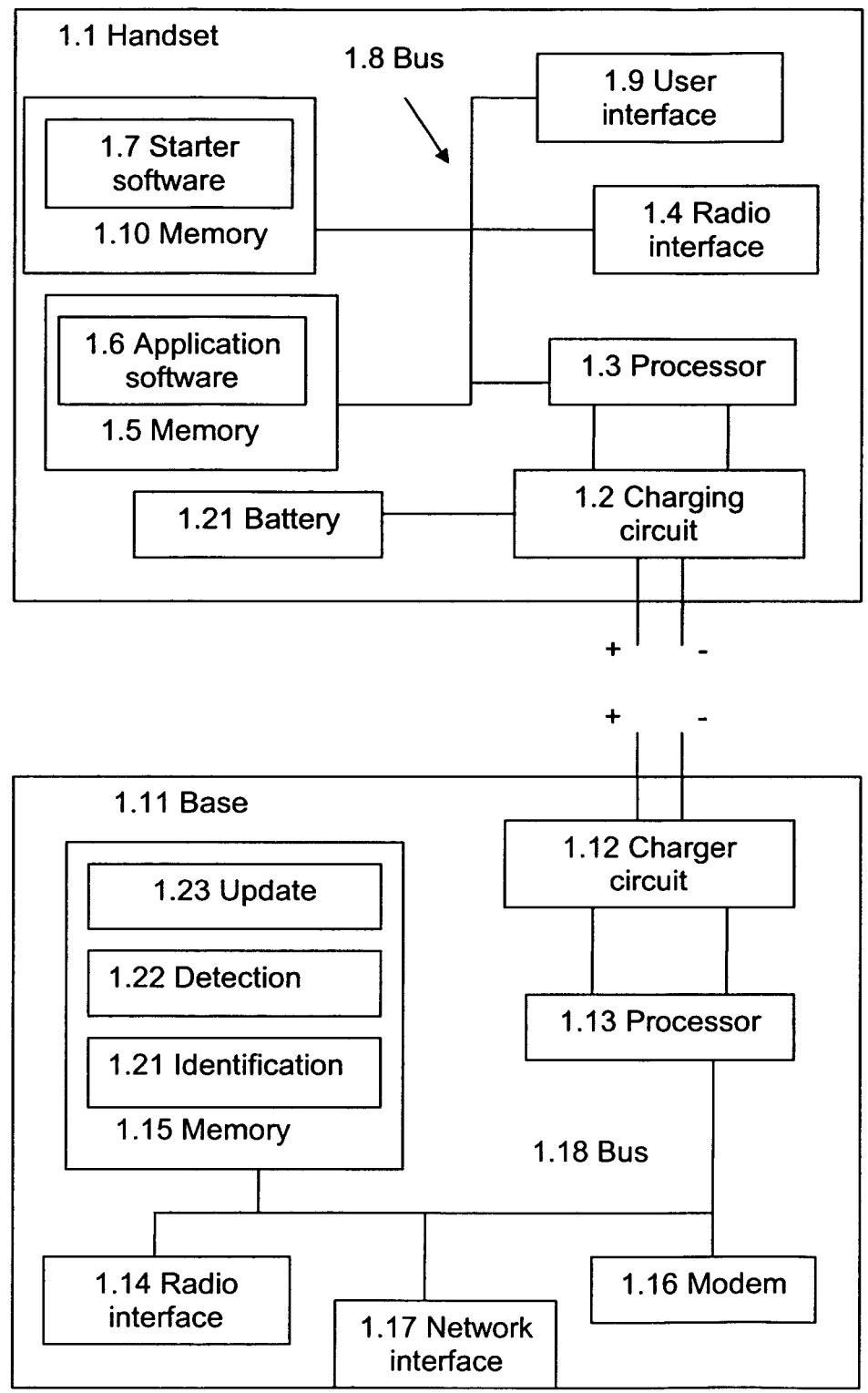
FIG. 1 is a block diagram of a handset and a base in accordance with the embodiment.

FIG. 1 shows a handset 1.1 and a base 1.11 in accordance with the embodiment.

The handset 1.1 comprises a processor 1.3, also noted as CPU, that controls a memory 1.5, and a memory 1.10, a radio interface 1.4 and a charging circuit 1.2 connected by an internal communication bus 1.8. The memory 1.5 comprises an application software 1.6. The memory 1.10, called boot memory hereafter can be for example a flash memory. It comprises a starter software 1.7. The starter software is run automatically on the processor when the handset is started up. In the operating mode of the handset, the starter software checks that the application software is integral.

It then loads this software onto the processor so as to cause the handset to operate with all its functionalities in its normal mode, the functionalities being among others the Digital Enhanced Cordless Telecommunications (DECT) protocol and application, the user interface, the telephony services.

The handset also comprises a user interface 1.9. In the embodiment, it consists in a screen and a keypad. The handset also comprises a battery 1.21 that is recharged from the base via the charging circuit 1.2. The battery provides the energy required for the correct operation of the handset.

The base 1.11 comprises a processor 1.13, also noted as CPU, a memory 1.15, a radio interface 1.14, a charger circuit 1.12, a modem 1.16 and a network interface 1.17, connected by an internal communication bus 1.18.

The memory 1.15 comprises an identification module for the handset and for the version of the software 1.21 supported by the handset, a detection module for a new available software version 1.22, and a module for updating the software of the handset 1.23, the update module also being designed to notify the handset of the availability of the new version of the software.

The network interface enables the base to be connected to an Internet type network (TCP/IP protocol) via a DSL type link. It can also link the base to a telephone network to enable the telephone applications to be implemented.

In the embodiment, the radio interface is compatible with the DECT standard. The handset is a DECT telephone.

According to other embodiments, the radio interface could be compatible with another type of wireless local network, compliant with the BLUETOOTH ® (BLUETOOTH is a trademark of Bluetooth Sig, Inc.)digital communication or WI-FI® (WI-FI is a trademark of Wi-Fi Alliance) digital communication standards for example.

In the embodiment, the charging circuit is used as a communication link between the base and the handset when they are connected by the charging circuit. The physical interface of the charging circuit is constituted by 2 charging contacts, present on the one hand in the base and on the other in the handset, indicated by the signs '+' and '−' in FIG. 1. Above this physical layer, the Universal Asynchronous Receiver Transmitter, noted as UART, bi-directional alternating current protocol also called half duplex is implemented. The flow over this link can reach or exceed 115 kbps. The main physical layer is described further on in the description.

The protocol used above the UART to implement the update of the software on the handset ensures the integrity of the software even in the event of an error in manipulation and does not require extra memory to be added to the handset. The software implementing this protocol and the control of the physical interface is physically stored in the boot memory. This boot memory is very small with respect to the memory containing the application software.

Figure 2:
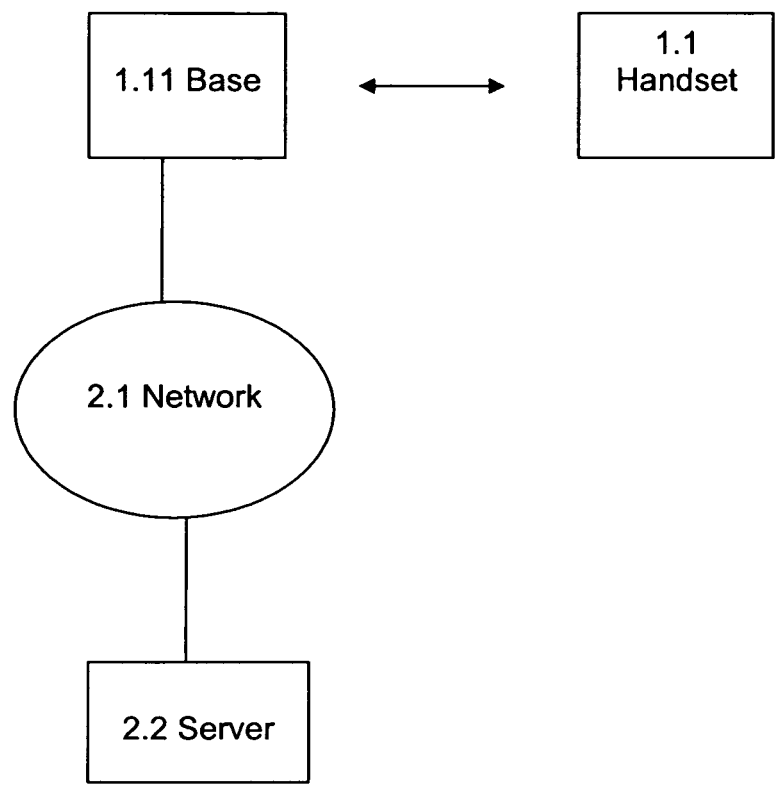
FIG. 2 is a functional diagram of the handset and the base.

FIG. 2 shows the base 1.11 and the handset 1.1. The base is connected to the network 2.1 via the network interface 1.17. This gives access to the server 2.2 that includes the new software versions. In the embodiment, the base regularly consults the server so as to detect the new available software versions. In another embodiment, the server informs the base when a new software version is available.

Figure 3:
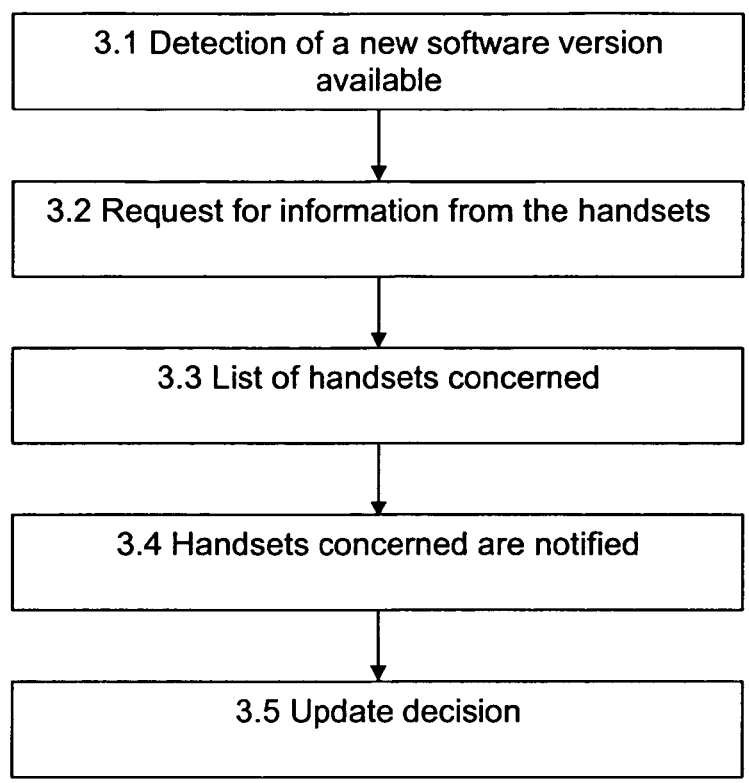
FIG. 3 is a diagram representing the exchanges between the base and the handset via the radio link, FIG. 4 specifies the update steps of the software.

FIG. 3 shows the exchanges between the base and the handset via the radio link when the base receives information on the availability of a new version of the software, or firmware, used by the handset. In these exchanges, the handset is in its normal operating mode.

The new version of the software is not downloaded by default by the base. The base consults a server located on the Internet network in order to determine the new software versions available. When a new software version is available 3.1, the base consults the handsets 3.2 to determine whether some of the handsets are affected by the new version, knowing that these handsets can be different models and therefore support versions that differ from each other. The base draws up a list of the handsets concerned 3.3, then alerts the handsets concerned 3.4. The alert on the handsets is a speech balloon that appears on the standby screen, in which "Update avail. Install now?" is displayed. The base will load the new software upon acceptance by the handsets.

Finally, the base will take the decision to update the handsets 3.5. That is, the update will take place when the handsets are connected to the base.

When the base learns that a new version of the software is available, it does not download it automatically. It will ensure beforehand that the handsets are concerned by the new version. In another embodiment, the base downloads the new version of the software before checking whether the handsets are affected.

During the verification of the handsets affected by the new version of the software, the base requests information from the handsets to establish the compatibility with the new version of the software. For each handset, it checks the identifier of the handset and version of the software supported. In the embodiment, the identifier of the handset corresponds to what is defined in the DECT standard, it is the International Personal Equipment Identity, marked IPEI.

Figure 4:
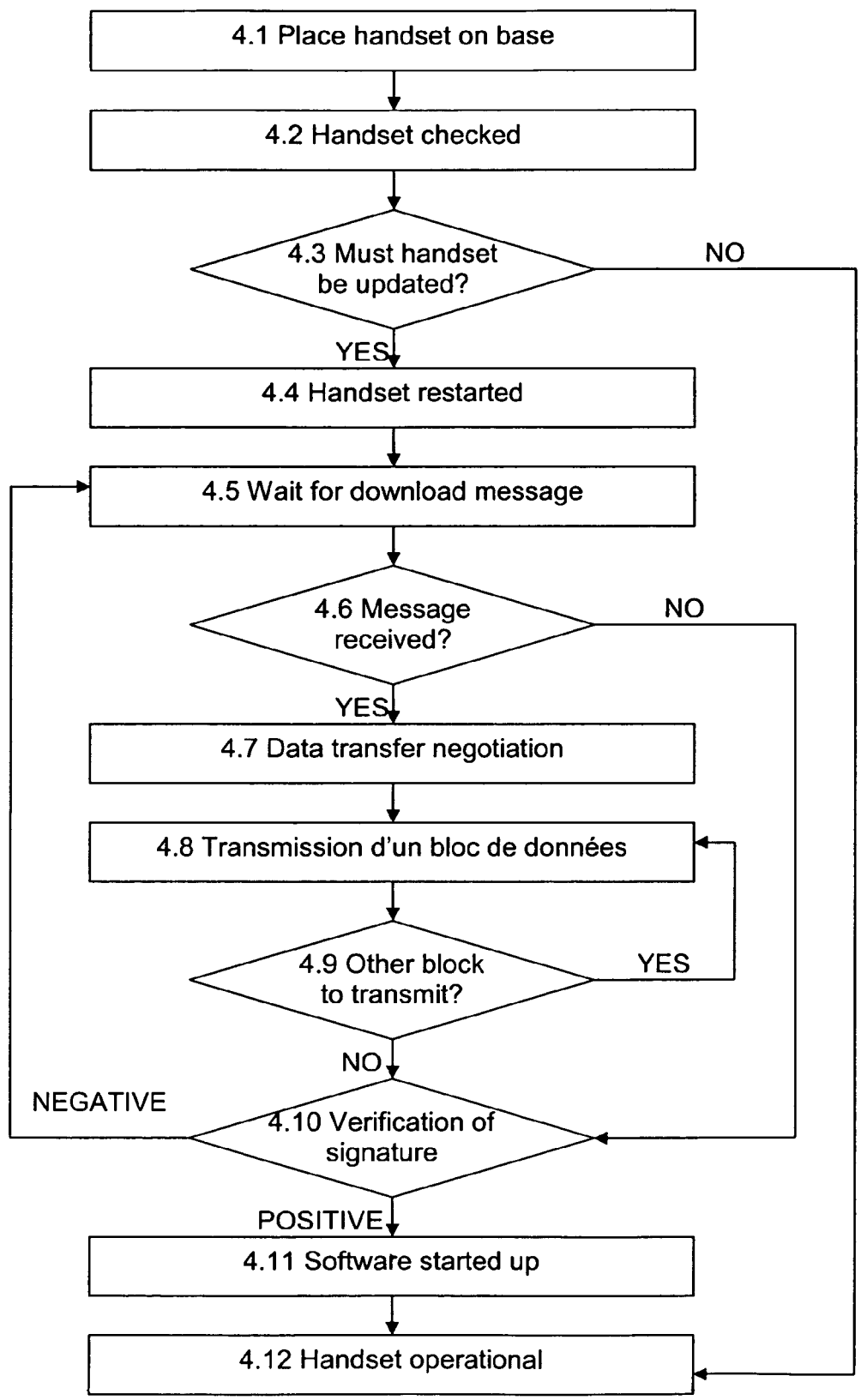

FIG. 4 shows the update steps of the software, when the decision has been taken by the base to continue with the update.

The kinematics of the update is as follows:

The handset connects to the base by means of the charging circuit. When the handset is connected to the base 4.1, the base checks whether the handset is actually part of the list of the handsets concerned by the update 4.2 & 4.3. If this is the case, the handset proceeds to start up 4.4. Otherwise, the handset is not updated and remains operational 4.12, namely that it is in its normal mode of operation.

After starting up, the handset, which is no longer in its normal operating mode, waits for a download request message 4.5 for a period, which can be 100 ms for example. If no message is received during the period, the update does not take place, and the entire software is checked 4.10. If a message is received 4.6, a negotiation 4.7 of the data transfer mode takes place between the base and the handset. This comprises for example the determination of the type of handset the size of the application to download, and the determination of the size of the transmission blocks.

The data is transmitted 4.8 & 4.9. It takes place in successive blocks. The reception of each block is validated by the handset by an acknowledgement of receipt.

When all the blocks have been transmitted, the integrity of the software is checked 4.10. If the signature is negative, the handset goes to state of waiting for a download message 4.5. If the signature is positive, the software can then start 4.11. Then the handset is operational again 4.12.

In another embodiment, when the charging circuit connects them, the communication link used between the handset and the base is different from that of the charging circuit. The communication link can be for example the radio link.

The operating principle of the communication interface between the base and the handset by the battery charging contacts is as follows: the charging voltage of the base is controlled by the processor of the base, through the charger circuit of the base. The current drawn by the handset is controlled by the processor of the handset, through the charging circuit of the handset.

Figure 5:
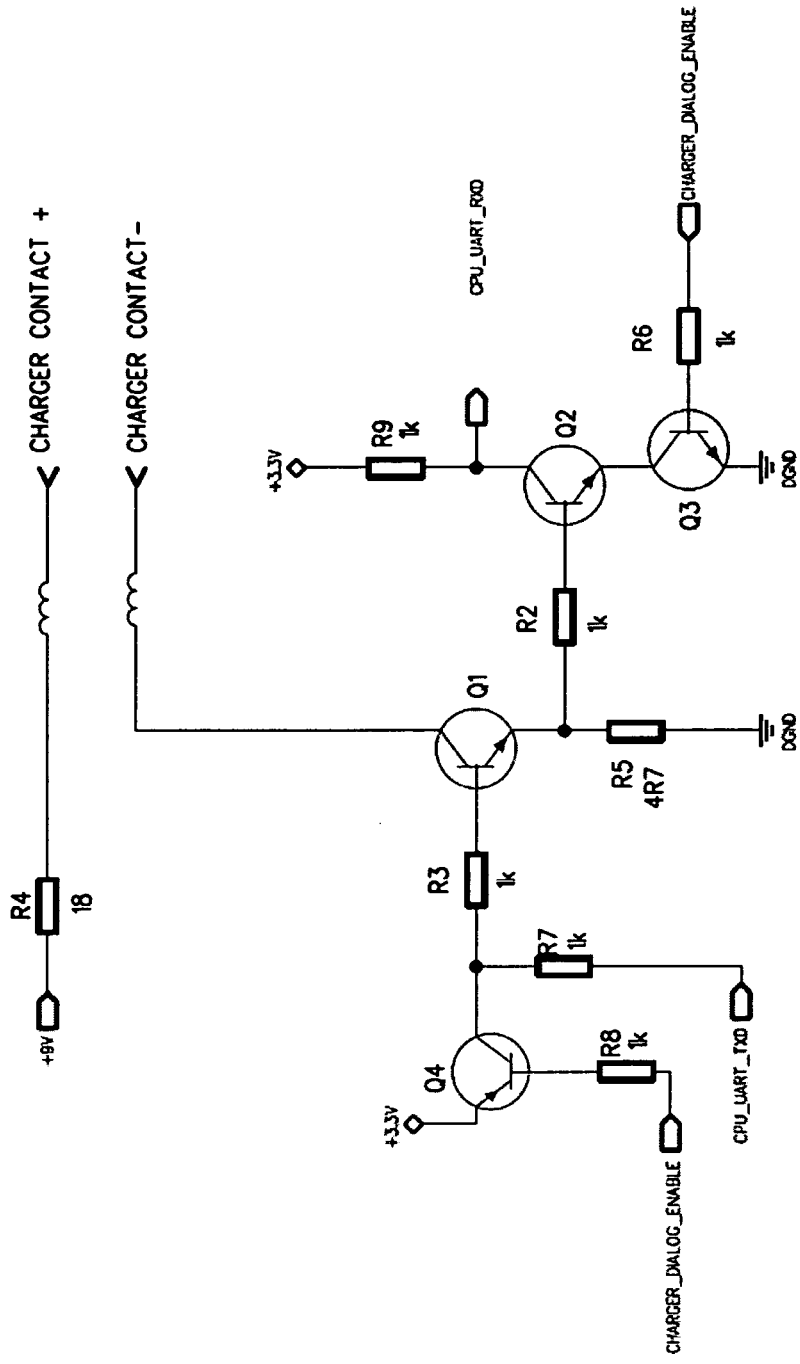
FIG. 5 shows the charger circuit of the base.
Figure 6:
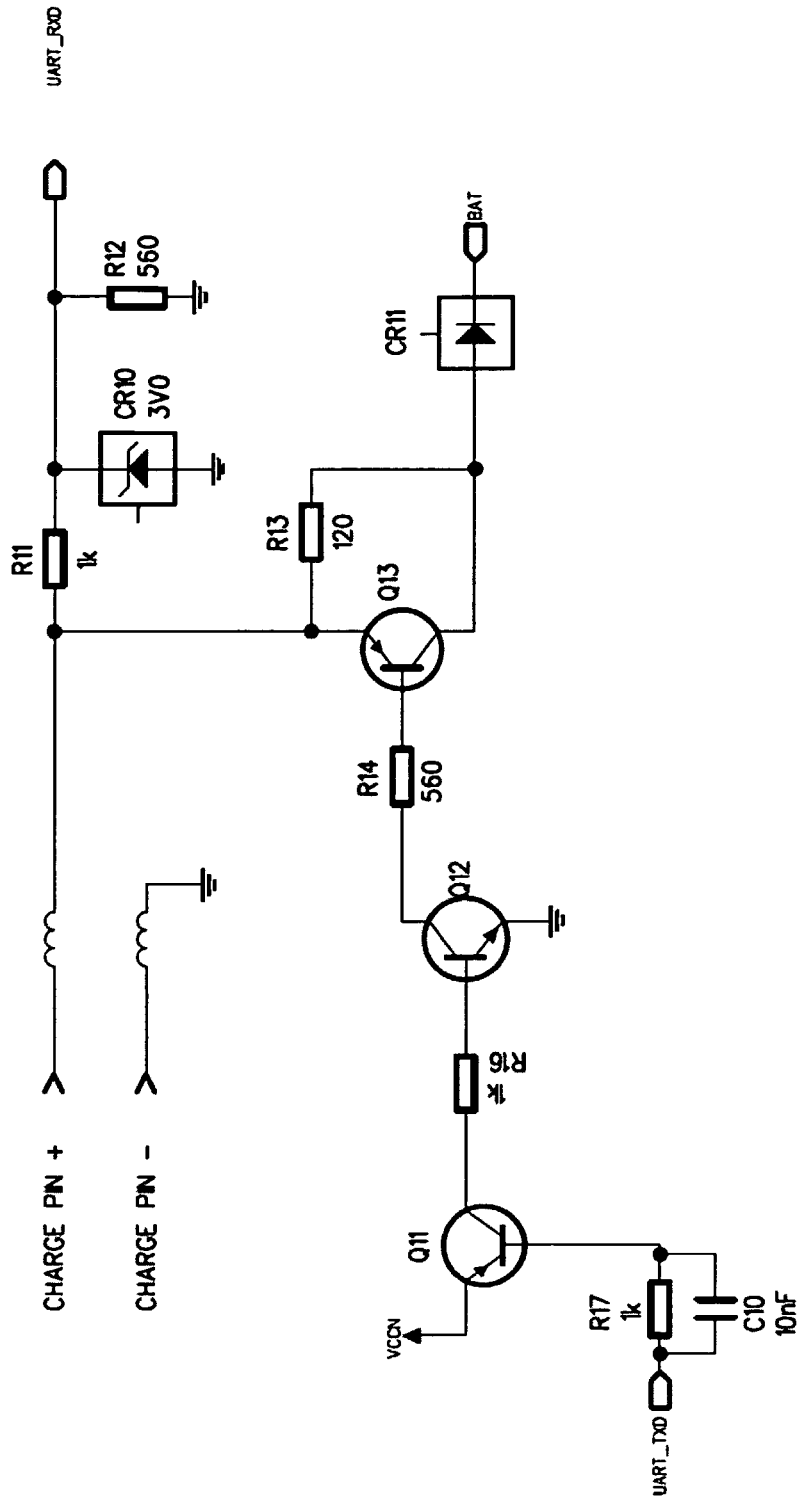
FIG. 6 shows the charging circuit of the handset.

FIG. 5 and FIG. 6 show the charger circuit of the base and the handset by means of transistors and resistors. As shown in FIG. 5, in the charger circuit of the base, the signal CHARGER_DIALOG_ENABLE coming from the processor of the base is normally at a low logic level. So the transistor Q4 is saturated, which has the effect of saturating transistor Q1. The charging voltage (generally at a value of 9V) is present between the positive and negative contacts of the base, and the UART of the processor can be used for other functions. The blocked transistor Q3 leaves the reception signal of the UART, CPU_UART_RXD, at the high level irrespective of the battery charging current of the handset.

To send data to the handset, the processor toggles the signal CHARGER_DIALOG_ENABLE to the high logic level (at the value of 3.3V). In this situation, the output of the UART (asynchronous serial port) of the processor, CPU_UART_TXD, that controls the battery charging voltage.

With regard to the transmission in the base, when the UART protocol of the base emits a high level, the charging voltage is present on the charging contacts. That is, if CPU_UART_TXD is at the high logic level, Q1 is saturated, the charging voltage is present on the contacts of the base. When the UART protocol of the base emits a low level, the charging voltage is null on the charging contacts. That is if CPU_UART_TXD is at the low logic level, Q1 is blocked, which cuts the charging voltage.

For the base to receive data, CPU_UART_TXD must be at the high level, and therefore the charging voltage must be present. If the handset switches the rapid charging current (generally greater than 150 mA typically, for example a value of 200 mA), the voltage at the terminals of resistor R5 is enough to saturate Q2, which sends a low level on the input port of the UART of the processor (CPU_UART_RXD). If the handset switches the trickle charge current (generally below 50 mA, for example of a value of 20 mA), the voltage at the terminals of R5 is too low, Q2 is blocked, the processor receives a high level on CPU_UART_RXD.

With regard to the charging circuit of the handset, indicated in FIG. 6, when the charging voltage is present on the contacts of the base, the charging circuit of the handset generates a high level on the UART of the handset. When the charging voltage is absent on the contacts of the base, the charging circuit of the handset generates a low level on the UART of the handset. In other words, when a sufficient voltage (greater than 6 V) is present on the charging contacts, the serial reception signal UART_RXD of the processor in the handset receives a high logic level. The 3V Zener diode CR10 enables the voltage on this input of the processor not to exceed 3V when the charging voltage crosses the threshold level. When the voltage is cut off, UART_RXD is at the low level.

Regarding the emission at the level of the handset, a high level on the output UART_TXD blocks the transistor Q11, which blocks Q12, which in turn blocks Q13, only letting the battery charge via the resistor R13 (with a typical value of 120 ohms), that is a trickle charge in the order of 30 mA. A low level at the UART_TXD output saturates Q11, Q12 and Q13, which enables the battery to be recharged with a high current greater than 150 mA (set by the current-limiting resistor R4 in the base).

In other words, when the UART of the handset emits a low level, the charge current drawn by the handset is equal to the rapid charge current. When the UART of the handset emits a high level, the charge current drawn by the handset is equal to the trickle charge current. When the current drawn by the handset is greater than a set threshold (approximately 100 mA), the charger circuit of the base generates a low level on the UART of the base. When the current drawn by the handset is lower than the set threshold, the charger circuit of the base generates a high level on the UART of the base.

The principle of communication between the base and the handset is therefore as follows:

When the transmitter of the base is at High, a 9 V voltage is present on the contacts, which sends a High level on the receiver of the handset.

When the transmitter of the base is at the Low level, the voltage is cut off, which forces a Low level on the receiver of the handset.

When the transmitter of the handset is High, the charge current of the battery is low, which sends a High level to the receiver of the base.

When the transmitter of the handset is Low, the charge current of the battery is high, which sends a Low level to the receiver of the base.

It should be noted that the handset can only transmit data to the base if the base is not transmitting (high rest level, charging voltage present). The communication is half duplex.

This mechanism provides the normal charging operation of the handset, outside of active communication periods. Indeed the absence of any transmitted signal corresponds to the standard charging operation.

The invention claimed is:
1. A base for a communication device, the base comprising:
a radio interface configured to communicate with the communication device, the communication device utilizing a software application, a charger circuit, connected to a charging circuit of a communication device by electrical charging contacts, for charging a battery of the communication device, a processor for controlling, through the charger circuit, a charging voltage at the electrical charging contacts for charging the battery of the communication device, the processor being configured to control switching between a presence of the charging voltage and an absence of the charging voltage at the electrical charging contacts, and a memory in communication with the processor, the memory comprising a detection module for detecting a new software version, an identification module for checking that the new software version is supported by the communication device, an update module for notifying the communication device by radio, of the availability of the new software version and for updating the software of the communication device, upon determination that the software version of the communication device is to be updated, by transmission of the new software version to the communication device via the electrical charging contacts, wherein the new software version is transmitted to the communication device via the electrical charging contacts when the charger circuit is connected to the charging circuit of the battery of the communication device and outside of a charging operation in which the charging voltage controlled by the processor is present on the electrical charging contacts of the charger circuit to charge the battery of the communication device.

2. The base according to claim 1, wherein the update module uses the charger circuit for transmission of the new software version to the communication device.

3. The base according to claim 2 wherein the identification module is configured to check the compatibility of the communication device with the new software version before the new software version is downloaded to the base.

4. The base according to claim 2, wherein transmission of the new software version to the communication device is carried out using a Universal Asynchronous Receiver Transmitter communication protocol.

5. The base according to claim 3, wherein the base is configured to request information from the communication device so as to establish the compatibility of the new software.

6. The base according to claim 1, wherein the base is for a domestic wireless telephone.

7. The base according to claim 1, wherein the radio link complies with the Digital Enhanced Cordless Communications standard.

8. The base according to claim 1, further comprising an interface to a communication network to detect and download the new software version.

9. The-base according to claim 1, wherein the base is configured to request information from the communication device before downloading new software so as to establish the compatibility of the new software.

10. Communication device, comprising:
a radio interface for communicating with a base,
a battery,
a charging circuit including electrical charging contacts for charging the battery via a charger circuit of the base, wherein
a charging voltage at the electrical charging contacts for charging the battery is controlled by a processor of the base through the charger circuit, the processor of the base being configured to control switching between a presence of the charging voltage and an absence of the charging voltage at the electrical charging contacts, a user interface, a processor configured to:
provide information indicating if a new software version is supported by the communication device,
indicate on the user interface the availability of the new software version, when the communication device is notified of the new software version by the base,
enable reception of the new software version from the base via the electrical charging contacts, wherein the new software version is received from the base via the electrical charging contacts when the charging circuit of the battery of the communication device is connected to the charger circuit of the base and outside of a charging operation in which the charging voltage controlled by a processor of the base is present on the electrical charging contacts of the charging circuit to charge the battery.

11. The communication device according to claim 10, the processor further configured to receive the new software version when the charging circuit is connected to the charger circuit of the base.

12. The communication device according to claim 11, wherein the processor configured enable reception of the new software version enables the reception upon determination that the software version of the communication device is to be updated.

13. The communication device according to claim 10, wherein the communication device is a telephone handset.

14. The communication device according to claim 10, wherein the communication device is a domestic wireless telephone.

15. The communication device according to claim 10, wherein the radio interface complies with the Digital Enhanced Cordless Communications standard.

16. Method in a communication device for downloading a new software version, the method comprising:
reception, from a base of the communication device, of information on the availability of a new software version,
detection of a new version of software for the communication device,
checking that the new software version is supported by the communication device,
informing the communication device on the availability of the new software version,
and, when a charging circuit of the communication device is connected to the charger circuit of the base,
checking that the software of the communication device is to be updated,
upon determination that the software version of the communication device is to be updated, downloading the new software version via electrical charging contacts of a battery charging circuit of the communication device when the battery charging circuit is connected to a charger circuit of the base, wherein the new software version is downloaded to the communication device via the electrical charging contacts outside of a charging operation in which the charging voltage controlled by a processor of the base is present on the electrical charging contacts of the battery charging circuit to charge the battery of the communication device,
wherein the new software version is transmitted to the communication device via the electrical charging contacts when the charger circuit of the base is connected to the charging circuit of the battery of the communication device and outside of charging operation in which the charging voltage controlled by the processor is present on the electrical charging contacts of the base to charge the battery of the communication device.

17. The method according to claim 16, wherein the new software version is received via the charging circuit.

18. The method according to claim 16, wherein the communication device is a domestic wireless telephone.

19. The method according to claim 16, further comprising communicating using a radio link which complies with the Digital Enhanced Cordless Communications standard.

20. The method according to claim 16, further comprising receiving the new software version when the charging circuit is connected to the charger circuit of the base.

21. The method according to claim 16, wherein a processor is configured to enable the reception of the new software version.

22. The method according to claim 16, wherein the communication device is a telephone handset.

23. A method, in a base for a communication device, for downloading a new version of software, said method comprising:
   detection of a new version of software for the communication device,
   checking that the new software version is supported by the communication device,
   informing the communication device on the availability of the new software version,
   and, when a charging circuit of the communication device is connected to the charger circuit of the base,
   checking that the software of the communication device is to be updated,
   downloading the new software version from the base to the communication device, the new software version being transmitted through electrical charging contacts of the charger circuit when a charging voltage controlled by a processor of the base is absent on the electrical charging contacts,
   wherein the new software version is transmitted to the communication device via the electrical charging contacts when the charger circuit of the base is connected to the charging circuit of the battery of the communication device and outside of charging operation in which the charging voltage controlled by the processor is present on the electrical charging contacts of the base to charge the battery of the communication device.

24. The method according to claim 23, wherein the downloading occurs between a server located on the network and the communication device.

25. The method according to claim 23, further comprising checking-the compatibility of the communication device with the new software version before the new software version is downloaded to the base.

26. The method according to claim 23, wherein the new software version is transmitted to the communication device using a Universal Asynchronous Receiver Transmitter communication protocol.

27. The method according to claim 23, further comprising detecting and downloading the new software version using an interface to a communication network.

28. The method according to claim 23, further comprising the checking that the new software version is supported by the telephone handset before the new software version is downloaded to the base.

29. The method according to claim 23, wherein the new software version is transmitted to the communication device using a Universal Asynchronous Receiver Transmitter communication protocol.

30. A base device comprising:
   a base for a communication device,
   a radio interface configured to communicate with the communication device utilizing a software application,
   a charger circuit, connected to a charging circuit of the communication device by electrical charging contacts, for charging a battery of the communication device,
   a processor for controlling, through the charger circuit, a charging voltage at the electrical charging contacts for charging the battery of the communication device, the processor being configured to control switching between a presence of the charging voltage and an absence of the charging voltage at the electrical charging contacts,
   a detection module configured to detect a new software version,
   an identification module configured to check that the new software version is supported by the communication device,
   an update module configured to notify the communication device by radio, of the availability of the new software version, and
   a transmission module configured to transmit the new software version to the communication device comprising via the electrical charging contacts upon determination that the software version of the communication device is to be updated, wherein the new software version is transmitted to the communication device via the electrical charging contacts when the charger circuit is connected to the charging circuit of the battery of the communication device and outside of charging operation in which the charging voltage controlled by the processor is present on the electrical charging contacts of the base to charge the battery of the communication device.

31. The base device according to claim 30, wherein the base is for a domestic wireless telephone.

32. The base device according to claim 30, wherein the radio link complies with the Digital Enhanced Cordless Communications standard.

33. The base device according to claim 30, further comprising an interface to a communication network to detect and download the new software version.

34. The base device according to claim 30, wherein transmission of the new software version to the communication device is carried out using a Universal Asynchronous Receiver Transmitter communication protocol.

\* \* \* \* \*